United States Patent [19]

Fujiwara et al.

[11] Patent Number: 5,284,908

[45] Date of Patent: Feb. 8, 1994

[54] PROCESS FOR PREPARING COPOLYMER LATEX AND USE OF COPOLYMER LATEX

[75] Inventors: Wataru Fujiwara; Junko Hyoda; Yasushi Toyoda; Saburo Mishiba, all of Niihama, Japan

[73] Assignee: Sumitomo Dow Limited, Osaka, Japan

[21] Appl. No.: 647,039

[22] Filed: Jan. 29, 1991

[30] Foreign Application Priority Data

| Feb. 2, 1990 | [JP] | Japan | 2-24653 |
| Mar. 16, 1990 | [JP] | Japan | 2-67449 |
| Mar. 16, 1990 | [JP] | Japan | 2-67450 |
| Mar. 19, 1990 | [JP] | Japan | 2-71000 |
| Mar. 20, 1990 | [JP] | Japan | 2-71436 |
| Mar. 20, 1990 | [JP] | Japan | 2-71437 |
| Oct. 3, 1990 | [JP] | Japan | 2-267171 |
| Jan. 22, 1991 | [JP] | Japan | 3-22973 |

[51] Int. Cl.$^5$ ................................ C08K 5/34
[52] U.S. Cl. .................... 524/718; 524/719; 524/720; 524/742; 524/750; 524/751; 524/754; 524/755; 524/776; 524/793; 524/795
[58] Field of Search .............. 524/718, 719, 742, 720, 524/754, 755, 776, 793, 795, 751, 750

[56] References Cited

U.S. PATENT DOCUMENTS

| 2,685,576 | 8/1954 | Fryling et al. | 524/836 |
| 3,595,826 | 7/1971 | Conard | 524/776 |
| 3,981,837 | 9/1976 | Papalos et al. | 524/745 |
| 4,013,824 | 3/1977 | Uranek et al. | 526/205 |
| 4,521,574 | 6/1985 | Patterson et al. | 526/204 |
| 4,950,711 | 8/1990 | Suwala et al. | 524/742 |
| 5,141,988 | 8/1992 | Suwala et al. | 524/750 |

FOREIGN PATENT DOCUMENTS

| 1316997 | 6/1987 | U.S.S.R. | 524/718 |

OTHER PUBLICATIONS

Database WPIL/Derwent No. 89-181508 on JP-A-1 118 592.
Database WPI/Derwent 73-504204 on JP-B-48 027 743.
Database WPIL/Derwent No. 91-061065 on JP-A-30 008 896.

Primary Examiner—John C. Bleutge
Assistant Examiner—Mark Sweet

[57] ABSTRACT

A copolymer latex which is useful in an adhesive composition, a paper coating composition, an adhesive composition for carpet lining and an adhesive composition for a rock fiber substrate is prepared by emulsion copolymerizing an aliphatic conjugated diene monomer and at least one other monomer copolymerizable therewith in the presence of a chain transfer agent and at least one compound having no copolymerizing reactivity selected from the group consisting of hydrocarbons having 5 to 12 carbon atoms, halogenated aromatic hydrocarbons, five or six membered ring heterocyclic compounds, aliphatic ethers and aliphatic esters in an amount of 1 to 100 parts by weight per 100 parts by weight of a total amounts of the aliphatic conjugated diene monomer and the other monomer.

10 Claims, No Drawings

PROCESS FOR PREPARING COPOLYMER LATEX AND USE OF COPOLYMER LATEX

BACKGROUND OF THE INVENTION

1. Field of the Invention

The present invention relates to a process for preparing a copolymer latex and use of said copolymer latex. More particularly, the present invention relates to a process for preparing a latex of a copolymer comprising an aliphatic conjugated diene monomer and at least one other monomer copolymerizable therewith and a use of said copolymer latex in an adhesive composition, a paper coating composition, and an adhesive composition for adhering a lining to a carpet and for a rock fiber substrate.

2. Description of the Related Art

It is known that a so-called butadiene base copolymer latex is widely used as a binder in a paper processing field or back-sizing of a carpet.

The copolymer latex is required to have diverse properties according to application fields. To this end, in general, a composition and a structure of the butadiene base copolymer latex are modified.

A copolymer latex is usually prepared by emulsion polymerization, and during the emulsion polymerization, fine coagula are formed though an amount of the fine coagula slightly varies with a composition of a monomer mixture, and kinds and amounts of additives.

Recently, in view of labor saving and rationalization, speeds in paper coating and printing are being increased, and a coating color which is durable to high speed coating and a coated paper which is durable to high speed printing are required.

That is, the coating color is required to have stability against mechanical shear as a property to be satisfied during coating, and the coated paper is required to have an adhesive strength, water resistance and blister resistance.

It is known that a copolymer latex which is one of components of the coating color has a large influence on these properties.

One of factors which deteriorate the mechanical stability of the coating color is fine coagula in the copolymer latex. When the copolymer latex contains a large amount of such coagula, there arise various problems such as streak trouble or stain of an applicator during blade coating, stain during calendering, and blanket piling during printing.

The copolymer latex can be used as an adhesive for a lining of a carpet such as tufted carpet or needle punched carpet, or as an adhesive for a rock fiber substrate which is used in a cushioning material for automobiles, a mat for construction or an industrial filter. In such applications, the fine coagula in the copolymer latex have adverse influence on the adhesion strength and water resistance.

In general, the fine coagula are removed by, for example, filtration since they contaminate a reactor and cause problems in various final applications of the copolymer latex. However, since the filtration procedure is very complicated, and an amount of the coagula which can be removed by the filtration is limited, it is almost impossible to completely remove the fine coagula, and productivity of final products is decreased.

SUMMARY OF THE INVENTION

One object of the present invention is to provide a process for preparing a copolymer latex which has improved stability and contains less fine coagula.

Another object of the present invention is to provide a copolymer latex which is useful in the preparation of a paper coating composition which has good mechanical stability during paper coating and improved adhesive strength, water resistance and blister resistance during or after printing.

A yet another object of the present invention is to provide a copolymer latex useful in the preparation of an adhesive composition for carpet lining which has improved adhesive strength and water resistance.

A further object of the present invention is to provide a copolymer latex useful in the preparation of an adhesive for rock fiber substrate which has improved adhesive strength and water resistance.

According to a first aspect of the present invention, there is provided a process for preparing a copolymer latex which comprises emulsion copolymerizing an aliphatic conjugated diene monomer and at least one other monomer copolymerizable therewith in the presence of a chain transfer agent and at least one compound having no copolymerizing reactivity selected from the group consisting of hydrocarbons having 5 to 12 carbon atoms, halogenated aromatic hydrocarbons, five or six membered ring heterocyclic compounds, aliphatic ethers and aliphatic esters in an amount of 1 to 100 parts by weight per 100 parts by weight of a total amounts of the aliphatic conjugated diene monomer and the other monomer..

According to a second aspect of the present invention there is provided an adhesive composition comprising the copolymer latex prepared by the process of the present invention.

According to a third aspect of the present invention there is provided a paper coating composition comprising the copolymer latex prepared by the process of the present invention.

According to a fourth aspect of the present invention there is provided an adhesive composition for carpet lining comprising the copolymer latex prepared by the process of the present invention.

According to a fifth aspect of the present invention there is provided an adhesive composition for a rock fiber substrate comprising the copolymer latex prepared by the process of the present invention.

DETAILED DESCRIPTION OF THE INVENTION

Specific examples of the aliphatic conjugated diene monomer are 1,3-butadiene, 2-methyl-1,3-butadiene, 2,3-dimethyl-1,3-butadiene, 2-chloro-1,3-butadiene, substituted linear conjugated pentadienes, and substituted and/or branched conjugated hexadienes. Only one monomer or a combination of at least two monomers can be used. In particular, 1,3-butadiene is preferable.

Specific examples of the other monomer which is copolymerizable with the aliphatic conjugated diene monomer are an ethylenically unsaturated carboxylic acid monomer, an alkenyl aromatic monomer, an unsaturated alkyl carboxylate monomer, an unsaturated monomer having a hydroxyalkyl group, a vinyl cyanide monomer and an unsaturated carboxylic amide monomer.

Specific examples of the ethylenically unsaturated carboxylic acid monomer are mono- or di-carboxylic acids and anhydrides thereof such as acrylic acid, methacrylic acid, crotonic acid, maleic acid, fumaric acid, itaconic acid and anhydrides thereof.

Specific examples of the alkenyl aromatic monomer are styrene, α-methylstyrene, methyl-α-methylstyrene, vinyltoluene and divinylbenzene or mixtures thereof. In particular, styrene is preferable.

Specific examples of the unsaturated alkyl carboxylate monomer are methyl acrylate, methyl methacrylate, ethyl acrylate, ethyl methacrylate, butyl acrylate, glycidyl methacrylate, dimethyl fumarate, diethyl fumarate, dimethyl maleate, diethyl maleate, dimethyl itaconate, monomethyl maleate, monoethyl fumarate, 2-ethylhexyl acrylate and mixtures thereof. In particular, methyl methacrylate is preferable.

Specific examples of the unsaturated monomer having the hydroxyalkyl group are β-hydroxyethyl acrylate, β-hydroxyethyl methacrylate, hydroxypropyl acrylate, hydroxypropyl methacrylate, hydroxybutyl acrylate, hydroxybutyl methacrylate, 3-chloro-2-hydroxypropyl methacrylate, diethylene glycol maleate, diethylene glycol itaconate, 2-hydroxyethyl maleate, bis(2-hydroxyethyl) maleate, 2-hydroxyethyl methyl fumarate and mixtures thereof. In particular, β-hydroxyethyl acrylate is preferable.

Specific examples of the vinyl cyanide monomer are acrylonitrile, methacrylonitrile, α-chloroacrylonitrile and α-ethylacrylonitrile. Only one monomer or a combination of at least two monomers can be used. In particular, acrylonitrile is preferable.

Specific examples of the unsaturated carboxylic amide are acrylamide, methacrylamide, N-methylolacrylamide, N-methylolmethacrylamide, N,N-dimethylacrylamide and mixtures thereof. In particular, acrylamide is preferred.

Although a composition of the monomers is not limited, it is preferable to use a monomer composition which comprises 10 to 80% by weight of the aliphatic conjugated diene monomer, 0 to 10% by weight of the ethylenically unsaturated carboxylic acid monomer, and 10 to 90% by weight of at least one monoolefinic monomer selected from the group consisting of the alkenyl aromatic monomer, the unsaturated alkyl carboxylate monomer, the unsaturated monomer having the hydroxyalkyl group, the vinyl cyanide monomer and the unsaturated carboxylic amide monomer. When the content of the aliphatic conjugated diene monomer is lower than 10% by weight, adhesion properties are deteriorated; and when it is higher than 80% by weight, a water resistance is poor. When the content of the ethylenically unsaturated carboxylic acid monomer is higher than 10% by weight, the latex has a disadvantageously high viscosity. When the content of the monoolefin monomer is lower than 10% by weight, a water resistance is poor; and when it is higher than 90% by weight, adhesion properties tend to be deteriorated.

Specific examples of the chain transfer agent are alkyl mercaptan such as n-hexyl mercaptan, n-octyl mercaptan, tert.-octyl mercaptan, n-dodecyl mercaptan, tert.-dodecyl mercaptan and n-stearyl mercaptan; a xanthogen compound such as dimethylxanthogen disulfide and diisopropylxanthogen disulfide; α-methylstyrene dimer; terpinolene; a thiuram compound such as tetramethylthiuram disulfide, tetraethylthiuram disulfide and tetramethylthiuram monosulfide; a phenol compound such as 2,6-di-tert.-butyl-4-methylphenol and styrenated phenol; an allyl compound such as allyl alcohol; a halogenated hydrocarbon such as dichloromethane, dibromomethane, carbon tetrachloride and carbon tetrabromide; and triphenylethane, pentaphenylethane, acrolein, metacrolein, thioglycolic acid and 2-ethylhexyl thioglycolate.

The amount of the chain transfer agent is not critical and suitably selected according to desired properties of the copolymer latex. The amount of the chain transfer agent is preferably from 0.05 to 10 parts by weight based on 100 parts by weight of the total amount of the monomers.

The hydrocarbon having 5 to 12 carbon atoms which has no copolymerizing reactivity is at least one hydrocarbon selected from the group consisting of an aromatic hydrocarbon, an alicyclic hydrocarbon and a linear hydrocarbon.

Specific examples of the aromatic hydrocarbon are benzene, toluene, o-xylene, m-xylene, p-xylene, cumene, 1,2,3-trimethylbenzene, 1,2,4-trimethylbenzene and 1,2,5-trimethylbenzene. Specific examples of the alicyclic hydrocarbon are cyclopentane, cyclohexane, cycloheptane, cyclooctane and methylcyclohexane. Specific examples of the linear hydrocarbon are pentane, hexane, heptane, 2-methylpentane, 3-methylisooctane, decane and dodecane.

Specific examples of the halogenated aromatic hydrocarbon having no copolymerizing reactivity are fluorobenzene, 2-fluorotoluene, 3-fluorotoluene, 4-fluorotoluene, 1,2-difluorobenzene, 1,3-difluorobenzene, 1,4-difluorobenzene, 1,2,3-trifluorobenzene, chlorobenzene, 2-chlorotoluene, 3-chlorotoluene, 4-chlorotoluene, benzyl chloride, 1,2-dichlorobenzene, 1,3-dichlorobenzene, 1,4-dichlorobenzene, bromobenzene, 2-bromotoluene, 3-bromotoluene, 4-bromotoluene, 1-chloro-2-fluorobenzene, 1-chloro-3-fluorobenzene and 1-chloro-4-fluorobenzene.

Specific examples of the five or six membered heterocyclic compound having no copolymerizing reactivity are furan, thiophene, tetrahydrothiophene, 2-methylthiophene, pyrrole, pyridine, pyrimidine, pyrrolidine, 1,4-dioxane, 1,3-dioxane and morpholine.

Specific examples of the aliphatic ether and ester having no copolymerization reactivity are ethyl ether, propyl ether, isopropyl ether, methyl propyl ether, methyl isopropyl ether, methyl butyl ether, methyl isobutyl ether, methyl n-amyl ether, methyl isoamyl ether, ethyl propyl ether, ethyl isopropyl ether, ethyl butyl ether, ethyl isobutyl ether, methyl acetate, ethyl acetate, propyl acetate, isopropyl acetate, butyl acetate, isobutyl acetate, methyl propionate, ethyl propionate, propyl propionate, isopropyl propionate, methyl butyrate, ethyl butyrate, methyl isobutyrate, ethyl isobutyrate, methyl valerate, ethyl valerate and methyl isovalerate.

These non-copolymerizable compounds may be used independently or as a mixture of two or more of them. Among these compounds, those having a solubility in water of 1% or less are preferred.

When the polymerization is carried out in the presence of the non-copolymerizable compound, the polymerization stability is improved so that the reactor is not contaminated and the amount of the generated fine coagula decreases. Accordingly, an yield of the copolymer latex is increased in comparison with polymerization in the absence of the non-copolymerizable compound.

In the present invention, the non-copolymerizable compound is used in an amount of 1 to 100 parts by weight per 100 parts by weight of the total amount of the monomers. When this amount is less than 1 parts by weight, the above effects of the non-copolymerizable compound are not achieved. Though the non-copolymerizable compound is easily recovered after polymerization and recycled, if its amount exceeds 100 parts by weight, an amount of energy consumed in its recovery becomes very large. Preferably, the non-copolymerizable compound is used in an amount of 1 to 70 parts by weight per 100 parts by weight of the total amount of the monomers.

The hydrocarbon to be used as the non-copolymerizable compound has 5 to 12 carbon atoms. If the hydrocarbon has a carbon atoms of less than five, it is in a gas state at normal temperature under normal pressure so that its handing is difficult. If the hydrocarbon has more than 12 carbon atoms, its boiling point is very high so that its recovery after polymerization is difficult.

The components can be added in any manner. They may be added to the reactor simultaneously, portionwise or continuously.

In the emulsion polymerization, any conventionally used emulsifier, polymerization initiator, electrolyte, polymerization accelerator or chelating agent may be used.

Examples of the emulsifier are anionic surfactants (e.g. sulfate of higher alcohol, alkylbenzenesulfonate, an aliphatic sulfonate salt, an aliphatic carboxylate, sulfate of an nonionic surfactant), a nonionic surfactant (e.g. alkyl ester, alkyl phenyl ether and alkyl ether of polyethylene glycol, etc.

Specific examples of the initiator are a water-soluble initiator such as potassium persulfate, ammonium persulfate, sodium persulfate; a redox type initiator; and oil-soluble initiator such as benzoyl peroxide.

By the above process of the present invention, generation of the fine coagula is suppressed, and the copolymer latex having improved stability is produced.

Since the compound having no copolymerizing reactivity is harmful to the working environment in the final use of the copolymer latex, it is removed from the latex to decrease its content to 0.5 parts by weight or less per 100 parts by weight of the solid content of the copolymer latex.

Such compound may be removed from the copolymer latex by a conventional method such as steam distillation, distillation under reduced pressure or blowing of an inert gas.

The copolymer latex prepared by the process of the present invention is preferably used in the preparation of various adhesive compositions such as a paper coating composition, an adhesive composition for carpet lining, an adhesive composition for a rock fiber substrate and an adhesive composition for tire cords, woods or leather.

The paper coating composition may be prepared by adding a pigment and optionally other binder to the copolymer latex to obtain an aqueous dispersion. The copolymer latex is used in an amount of 2 to 100 parts by weight, preferably 5 to 30 parts by weight, and the other binder is used in an amount of 0 to 30 parts by weight per 100 parts by weight of the pigment (all in terms of solid contents).

Specific examples of the pigment are an inorganic pigment such as kaolin clay, talc, barium sulfate, titanium oxide, calcium carbonate, aluminum hydroxide, zinc oxide, titanium white, and an organic pigment such as polystyrene latex. A single pigment or a combination of at least two pigments may be used.

Examples of the other binder are a natural binder such as starch, modified starch, for example, oxidized starch and esterified starch, soybean protein and casein; and synthetic latex such as polyvinyl alcohol, polyvinyl acetate latex and acrylic latex.

If necessary, is used other aid, for example, a dispersing agent, e.g., sodium pyrophosphate, polysodium acrylate and sodium hexametaphosphate; an antifoaming agent, e.g. polyglycol, an ester of a fatty acid, a phosphate ester and an silicone oil; a leveling agent, e.g. Turkey red oil, dicyandiamide and urea; an antiseptic; a waterproofing agent, e.g. formalin, hexamine, a melamine resin, a urea resin, glyoxal; a mold releasing agent, e.g. calcium stearate, a paraffin emulsion; a fluorescent dye; a color water retentivity improving agent, e.g. a carboxymethyl cellulose and sodium alginate.

The paper coating composition of the present invention can be coated on a sheet of paper by a per se conventional method, for example, with an air knife coater, a blade coater, a roll coater or a bar coater. After coating, the surface of the coated paper is dried and finished by, for example, calendering.

The adhesive composition for carpet lining may be prepared by adding a filler and/or other additive to the copolymer latex.

The filler is used in an amount of 0 to 800 parts by weight per 100 parts by weight in terms of solid contents.

Examples of the filler are calcium carbonate, aluminum hydroxide, hollow glass balloons, clay, talc, silica and carbon black. A single filler or a combination of at least two fillers may be used.

Examples of the other additive are a pH adjuster, an emulsifier, a stabilizer, a vulcanizing agent, a vulcanizing accelerator, an age resistor, a dispersant, an antifoaming agent, an antiseptic, a thickner, a colorant, a cross linking agent and a cross linking aid.

The adhesive composition for a rock fiber substrate comprises the copolymer latex and conventionally used additives such as a filler, an emulsifier, a stabilizer, an antioxidant, a UV light absorbing agent, a vulcanizing agent, a vulcanizing accelerator, a dispersant, an antifoaming agent, an antiseptic, a thickner, a colorant, a cross linking agent and a cross linking aid.

PREFERRED EMBODIMENTS OF THE INVENTION

The present invention will be illustrated by following Examples, in which "parts" and "%" are by weight unless otherwise indicated.

The properties in Examples are measured as follows:

CONTAMINATION OF REACTOR INSIDE

After polymerization, deposits on a inner wall of a reactor are observed and ranked as follow:

O: A very few deposits
X: A few deposits
XX: Many deposits.

FINE COAGULA

The fine coagula of several micrometers to 50 micrometers are observed with a microscope and ranked as follow:

O: A very few coagula
X: A few coagula

XX: Many coagula.

A NUMBER AVERAGE PARTICLE SIZE

Sizes of 500 particles are measured by an electron microscope and averaged.

GEL CONTENT

A latex film is formed by drying the copolymer latex at room temperature. Then, about 1.0 g of the latex film is accurately weighed and added to 400 ml of toluene followed by kept standing for 48 hours. The mixture is filtered through a 300 mesh screen. Materials which are insoluble in toluene and left on the screen (gel) are dried and a gel content is calculated.

PREPARATION OF COPOLYMER LATEX (1)

Monomers, tert.-dodecylmercaptan and a hydrocarbon (toluene, cyclopentane or isooctane) shown in Table 1, and also sodium dodecylbenzenesulfonate (0.6 part), sodium hydrogencarbonate (0.5 part), ammonium persulfate (0.8 part) and water (100 parts) were charged in a 10 liters autoclave and polymerized while stirring at 65° C. A polymerization conversion was 99% or higher in all cases.

In case of Latex No. 4, a two-step polymerization was carried out. That is, the monomers in the parentheses in Table 1 were added to the reaction system when the conversion in the first step reached 80% and the polymerization completed. The final conversion was 99% or higher.

To each latex, a 10% sodium hydroxide was added to adjust pH at 8, and the unreacted monomers and the hydrocarbon were removed by steam distillation to obtain the copolymer latex. In all cases, the total residual amount of the unreacted monomers and the hydrocarbon was less than 0.1 parts per 100 parts of the solid content in the copolymer latex.

TABLE 1

| Latex No. | 1 | 2 | 3 | 4 | 5 | 6 | 7 | 8 | 9(C) | 10(C) | 11(C) |
|---|---|---|---|---|---|---|---|---|---|---|---|
| Composition (parts) | | | | | | | | | | | |
| 1,3-Butadiene | 20 | 35 | 35 | 35 | 50 | 50 | 60 | 70 | 50 | 50 | 60 |
| Styrene | 61 | 57 | 53 | 23(5) | 47 | 47 | 27 | 17 | 47 | 47 | 47 |
| Methyl methacrylate | 15 | — | — | 15(10) | — | — | — | 10 | — | — | — |
| Acrylonitrile | — | 5 | 10 | 10 | — | — | 10 | — | — | — | 10 |
| β-Hydroxyethyl acrylate | 1 | — | — | — | 1 | 1 | 1 | — | 1 | 1 | 1 |
| Acrylamide | — | 1 | 1 | — | — | — | — | — | — | — | — |
| Itaconic acid | — | 2 | 1 | — | 2 | 2 | — | 2 | 2 | 2 | — |
| Fumaric acid | 2 | — | — | — | — | — | 2 | — | — | — | 2 |
| Acrylic acid | 1 | — | — | 2 | — | — | — | 1 | — | — | — |
| tert.-Dodecyl mercaptan | 0.4 | 1.5 | 1.0 | 0.8 | 0.8 | 0.2 | 2.0 | 1.2 | 0.9 | 0.5 | 1.5 |
| Toluene | 7 | 20 | — | 10 | 3 | — | — | 20 | — | 0.5 | — |
| Cyclopentane | — | — | — | — | — | 10 | 60 | — | — | — | — |
| Isooctane | — | — | 40 | — | — | — | — | — | — | — | — |
| Results of polymerization | | | | | | | | | | | |
| Deposits on reactor wall | O | O | O | O | O | O | O | O | X | X | XX |
| Fine coagula | O | O | X | O | X | O | X | O | XX | XX | XX |
| Number average particle size (nm) | 210 | 190 | 220 | 180 | 170 | 180 | 200 | 200 | 170 | 170 | 200 |
| Gel content (%) | 35 | 24 | 62 | 55 | 78 | 89 | 43 | 82 | 88 | 92 | 68 |

PREPARATION OF POLYMER LATEX (2)

Monomers, tert.-dodecylmercaptan and a hydrocarbon (toluene, cyclopentane or isooctane) shown in Table 2, and also sodium dodecylbenzenesulfonate (0.6 part), sodium hydrogencarbonate (0.5 part), potassium persulfate (0.8 part) and water (100 parts) were charged in a 10 liters autoclave and polymerized while stirring at 65° C. A polymerization conversion was 99% or higher in all cases.

In case of Latex No. 16, a two-step polymerization was carried out. That is, the monomers in the parentheses in Table 2 were added to the reaction system when the conversion in the first step reached 80% and the polymerization completed. The final conversion was 99% or higher.

To each latex, a 5% aqueous ammonia was added to adjust pH at 6, and the unreacted monomers and the hydrocarbons were removed by steam distillation to obtain the copolymer latex. In all cases, the total residual amount of the unreacted monomers and the hydrocarbons was less than 0.1 parts per 100 parts of the solid content in the copolymer latex.

TABLE 2

| Latex No. | 12 | 13 | 14 | 15 | 16 | 17 | 18 | 19 | 20(C) | 21(C) | 22(C) |
|---|---|---|---|---|---|---|---|---|---|---|---|
| Composition (parts) | | | | | | | | | | | |
| 1,3-Butadiene | 20 | 25 | 35 | 35 | 35 | 40 | 50 | 70 | 25 | 35 | 50 |
| Styrene | 61 | 67 | 53 | 57 | 23(5) | — | 47 | 17 | 67 | 53 | 47 |
| Methyl methacrylate | 15 | 5 | — | — | 15(10) | — | — | — | 5 | — | — |
| Acrylonitrile | — | — | 10 | 5 | 10 | 58 | — | 10 | — | 10 | — |
| β-Hydroxyethyl acrylate | 1 | 1 | — | — | — | — | 1 | 1 | 1 | — | 1 |
| Acrylamide | — | — | 1 | 1 | — | — | — | — | — | 1 | — |
| Itaconic acid | — | — | 1 | 2 | — | — | 2 | — | — | 1 | 2 |
| Fumaric acid | 2 | 2 | — | — | — | 1 | — | 2 | 2 | — | — |
| Acrylic acid | 1 | — | — | — | 2 | 1 | — | — | — | — | — |
| tert.-Dodecyl mercaptan | 0.4 | 0.3 | 1.0 | 1.5 | 0.8 | 1.2 | 0.2 | 2.0 | 0.5 | 0.7 | 0.9 |
| Toluene | 7 | — | — | 20 | 10 | 10 | — | — | — | — | — |
| Cyclohexane | — | — | — | — | — | — | 10 | 60 | 0.5 | — | — |
| Isooctane | — | 10 | 40 | — | — | — | — | — | — | — | — |
| Results of polymerization | | | | | | | | | | | |
| Deposits on reactor wall | O | O | O | O | O | O | O | O | XX | XX | X |
| Fine coagula | O | O | X | O | O | O | O | X | XX | XX | XX |

TABLE 2-continued

| Latex No. | 12 | 13 | 14 | 15 | 16 | 17 | 18 | 19 | 20(C) | 21(C) | 22(C) |
|---|---|---|---|---|---|---|---|---|---|---|---|
| Number average particle size (nm) | 220 | 210 | 220 | 200 | 180 | 190 | 190 | 210 | 180 | 170 | 190 |
| Gel content (%) | 35 | 52 | 62 | 24 | 55 | 78 | 85 | 49 | 72 | 75 | 88 |

PREPARATION OF POLYMER LATEX (3)

In a 10 liter autoclave which had been replaced with nitrogen gas, ion-exchanged water (100 parts), sodium hydrogencarbonate (0.1 part), potassium persulfate (0.8 part), sodium dodecylbenzenesulfonate (0.5 part), and monomers and a hydrocarbon (toluene, cyclopentane or isooctane) shown in Table 3 were charged and polymerized while stirring at 75° C. A polymerization conversion was 99% or higher in all cases.

The unreacted monomers and the hydrocarbon were removed by steam distillation to obtain the copolymer latex. In all cases, the total residual amount of the unreacted monomers and the hydrocarbon was less than 0.1 parts per 100 parts of the solid content in the copolymer latex.

TABLE 3

| Latex No. | 23 | 24 | 25 | 26 | 27 (C) | 28 (C) |
|---|---|---|---|---|---|---|
| Composition (parts) | | | | | | |
| 1,3-Butadiene | 40 | 40 | 60 | 57 | 40 | 57 |
| Itaconic acid | 2 | 2 | 3 | 3 | 2 | 3 |
| Styrene | 57 | 57 | 36 | — | 57 | — |
| β-Hydroxyethyl acrylate | 1 | 1 | 1 | — | 1 | — |
| Acrylonitrile | — | — | — | 40 | — | 40 |
| tert.-Dodecyl mercaptan | 0.4 | 0.7 | 1.0 | 0.8 | 1.2 | 1.6 |
| Toluene | 10 | — | — | 10 | — | — |
| Cyclopentane | — | 8 | — | — | — | — |
| Isooctane | — | — | 12 | — | — | — |
| Results of polymerization | | | | | | |
| Deposits on reactor wall | ○ | ○ | ○ | ○ | XX | XX |
| Fine coagula | ○ | ○ | ○ | ○ | XX | XX |
| Number average particle size (nm) | 150 | 150 | 160 | 140 | 150 | 140 |
| Gel content (%) | 56 | 47 | 38 | 52 | 34 | 51 |

PREPARATION OF POLYMER LATEX (4)

In a 20 liter autoclave which had been replaced with nitrogen gas, ion-exchanged water (100 parts), sodium hydrogencarbonate (0.1 part), potassium persulfate (0.8 part), sodium dodecylbenzenesulfonate (0.8 part), and monomers and a hydrocarbon (toluene or isooctane) shown in Table 4 were charged and polymerized while stirring at 65° C. A polymerization conversion was 98% or higher in all cases.

To each latex, a 10% sodium hydroxide was added to adjust pH at 8. The unreacted monomers and the hydrocarbon were removed by steam distillation to obtain the copolymer latex. In all cases, the total residual amount of the unreacted monomers and the hydrocarbon was less than 0.1 parts per 100 parts of the solid content in the copolymer latex.

TABLE 4

| Latex No. | 29 | 30 | 31 | 32 | 33 | 34 | 35(C) | 36(C) | 37(C) | 38(C) |
|---|---|---|---|---|---|---|---|---|---|---|
| Composition (parts) | | | | | | | | | | |
| 1,3-Butadiene | 18 | 27 | 32 | 36 | 40 | 45 | 27 | 34 | 45 | 55 |
| Styrene | 79.5 | 60.5 | 45 | 61 | 57.5 | 42 | 70.5 | 53.5 | 52.5 | 32.5 |
| Methyl methacrylate | — | 10 | 20 | — | — | 10 | — | 10 | — | 10 |
| β-Hydroxyethyl acrylate | — | — | 1 | 1 | — | 1 | — | — | — | — |
| Itaconic acid | 1 | 1 | — | — | 1 | — | 1 | 1 | 1 | 1 |
| Acrylic acid | 1.5 | 1.5 | — | — | 1.5 | — | 1.5 | 1.5 | 1.5 | 1.5 |
| Fumaric acid | — | — | 2 | 2 | — | 2 | — | — | — | — |
| tert.-Dodecyl mercaptan | 0.3 | 0.8 | 1.0 | 1.0 | 1.5 | 2.0 | 0.5 | 1.0 | 1.0 | 2.0 |
| Toluene | 15 | 15 | — | 3 | — | 70 | 0.5 | — | 0.2 | — |
| Hexane | — | — | 15 | — | 45 | — | — | — | — | — |
| Results of polymerization | | | | | | | | | | |
| Deposits on reactor wall | ○ | ○ | ○ | ○ | ○ | ○ | XX X | XX XX | X XX | XX XX |
| Fine coagula | ○ | ○ | ○ | ○ | ○ | ○ | X | XX | XX | XX |

PREPARATION OF POLYMER LATEX (5)

Monomers, tert.-dodecylmercaptan and a halogenated aromatic hydrocarbon (fluorobenzene, chlorobenzene or bromobenzene) shown in Table 5, and also sodium dodecylbenzenesulfonate (0.6 part), sodium hydrogencarbonate (0.5 part), ammonium persulfate (0.8 part) and water (100 parts) were charged in a 10 liters autoclave and polymerized while stirring at 65° C. A polymerization conversion was 99% or higher in all cases.

In case of Latex No. 42, a two-step polymerization was carried out. That is, the monomers in the parentheses were added to the reaction system when the conversion in the first step reached 80% and the polymerization completed. The final conversion was 99% or higher.

The unreacted monomers and the halogenated aromatic hydrocarbon were removed by steam distillation to obtain the copolymer latex. In all cases, the total residual amount of the unreacted monomers and the halogenated aromatic hydrocarbon was 0.1 parts per 100 parts of the solid content in the copolymer latex.

TABLE 5

| Latex No. | 39 | 40 | 41 | 42 | 43 | 44 | 45(C) | 46(C) |
|---|---|---|---|---|---|---|---|---|
| Composition (parts) | | | | | | | | |
| 1,3-Butadiene | 28 | 35 | 40 | 40 | 50 | 70 | 35 | 50 |
| Styrene | 59 | 47 | 43 | 22(5) | 40 | 17 | 47 | 35 |
| Methyl methacrylate | 10 | 15 | — | 15(5) | 5 | — | 15 | 10 |
| Acrylonitrile | — | — | 15 | 10 | — | 10 | — | — |

TABLE 5-continued

| Latex No. | 39 | 40 | 41 | 42 | 43 | 44 | 45(C) | 46(C) |
|---|---|---|---|---|---|---|---|---|
| β-Hydroxyethyl acrylate | 1 | — | — | — | 2 | — | — | 2 |
| Acrylamide | — | 1 | — | — | — | — | 1 | — |
| Itaconic acid | 2 | — | 1 | 2 | — | — | — | — |
| Maleic acid | — | 2 | — | — | 1 | — | 2 | 1 |
| Acrylic acid | — | — | 1 | 1 | 2 | 3 | — | 2 |
| tert.-Dodecyl mercaptan | 0.5 | 0.3 | 0.6 | 1.6 | 1.2 | 0.5 | 0.6 | 1.5 |
| Fluorobenzene | — | 10 | — | — | — | 5 | — | — |
| Chlorobenzene | 5 | — | 10 | — | 60 | — | — | — |
| Bromobenzene | — | — | — | 5 | — | — | — | — |
| Results of polymerization | | | | | | | | |
| Deposits on reactor wall | ○ | ○ | ○ | ○ | ○ | ○ | XX | XX |
| Fine coagula | ○ | ○ | ○ | X | ○ | ○ | XX | XX |
| Gel content (%) | 35 | 75 | 50 | 35 | 70 | 82 | 87 | 82 |

PREPARATION OF POLYMER LATEX (6)

Monomers, tert.-dodecylmercaptan and a heterocyclic compound (tetrahydrofuran, thiophene or 1,4-dioxane) shown in Table 6, and also sodium dodecylbenzenesulfonate (0.6 part), sodium hydrogencarbonate (0.5 part), ammonium persulfate (0.8 part) and water (100 parts) were charged in a 10 liters autoclave and polymerized while stirring at 65° C. A polymerization conversion was 99% or higher in all cases.

In case of Latex No. 49, a two-step polymerization was carried out. That is, the monomers in the parentheses were added to the reaction system when the conversion in the first step reached 80% and the polymerization completed. The final conversion was 99% or higher.

The unreacted monomers and the heterocyclic compound were removed by steam distillation to obtain the copolymer latex. In all cases, the total residual amount of the unreacted monomers and the heterocyclic compound was 0.1 parts per 100 parts of the solid content in the copolymer latex.

TABLE 6

| Latex No. | 47 | 48 | 49 | 50 | 51 (C) | 52 (C) |
|---|---|---|---|---|---|---|
| Composition (parts) | | | | | | |
| 1,3-Butadiene | 25 | 37 | 42 | 55 | 35 | 50 |
| Styrene | 62 | 45 | 15 (15) | 35 | 47 | 35 |
| Methyl methacrylate | 10 | 15 | 15 (5) | 5 | 15 | 10 |
| Acrylonitrile | — | — | 5 | — | — | — |
| β-Hydroxyethyl acrylate | 1 | — | — | 2 | — | 2 |
| Acrylamide | — | 1 | — | — | 1 | — |
| Itaconic acid | 2 | — | 2 | — | — | — |
| Maleic acid | — | 2 | — | 1 | 2 | 1 |
| Acrylic acid | — | — | 1 | 2 | — | 2 |
| tert.-Dodecylmercaptan | 0.5 | 0.3 | 0.6 | 1.2 | 0.6 | 1.5 |
| Tetrahydrofuran | 5 | — | — | — | — | — |
| Thiophene | — | 3 | — | 4 | — | — |
| 1,4-Dioxane | — | — | 50 | — | — | — |
| Results of polymerization | | | | | | |
| Deposits on reactor wall | X | ○ | ○ | ○ | XX | XX |
| Fine coagula | ○ | ○ | X | ○ | XX | XX |
| Content of gel (%) | 30 | 74 | 33 | 72 | 87 | 82 |

PREPARATION OF POLYMER LATEX (7)

Monomers, a chain transfer agent and a hydrocarbon shown in Table 7, and also sodium dodecylbenzenesulfonate (0.6 part), sodium hydrogencarbonate (0.5 part), ammonium persulfate (0.8 part) and water (100 parts) were charged in a 10 liters autoclave and polymerized while stirring at 65° C. A polymerization conversion was 99% or higher in all cases.

The unreacted monomers and the hydrocarbon were removed by steam distillation to obtain the copolymer latex. In all cases, the total residual amount of the unreacted monomers and the hydrocarbon was 0.1 parts per 100 parts of the solid content in the copolymer latex.

TABLE 7

| Latex No. | 53 | 54 | 55 | 56 | 57 | 58 | 59 | 60(C) | 61(C) | 62(C) |
|---|---|---|---|---|---|---|---|---|---|---|
| Composition (parts) | | | | | | | | | | |
| 1,3-Butadiene | 15 | 35 | 35 | 35 | 40 | 40 | 70 | 25 | 35 | 50 |
| Styrene | 66 | 51 | 48 | 62 | 36 | 43 | 17 | 57 | 52 | 42 |
| Methyl methacrylate | 15 | — | 15 | — | 15 | — | 10 | 15 | — | 5 |
| Acrylonitrile | — | 10 | — | — | 5 | 15 | — | — | 10 | — |
| β-Hydroxyethyl acrylate | 1 | — | 1 | — | 1 | 1 | 1 | 1 | — | 1 |
| Acrylamide | — | 2 | — | 1 | — | — | — | — | 1 | — |
| Itaconic acid | 1 | — | — | 2 | — | 1 | 2 | 1 | 1 | 2 |
| Fumaric acid | 2 | 2 | — | — | 3 | — | — | 1 | — | — |
| Acrylic acid | — | — | 1. — | — | — | — | — | 1 | — | — |
| a-Methylstyrene dimer | 1.0 | — | — | — | — | — | 0.3 | 1.0 | — | — |
| Terpinolene | — | 0.5 | — | — | — | — | — | — | — | — |
| Tetramethylthiuram disulfide | — | — | 2.0 | — | — | — | — | — | 2.5 | — |
| Styrenated phenol | — | — | — | 2.5 | — | — | 0.5 | — | — | — |
| Carbon tetrabromide | — | — | — | — | 0.5 | — | — | — | — | 0.8 |
| Triphenylmethane | — | — | — | — | — | 1.0 | — | — | — | — |
| Toluene | 10 | — | — | 20 | — | — | 10 | — | — | — |
| Cyclopentane | — | 5 | — | — | — | — | — | — | — | — |
| Isooctane | — | — | 30 | — | — | — | — | — | — | — |
| Chlorobenzene | — | — | — | — | 60 | — | — | — | — | — |
| Thiophene | — | — | — | — | — | 3 | — | — | — | — |
| Results of polymerization | | | | | | | | | | |

TABLE 7-continued

| Latex No. | 53 | 54 | 55 | 56 | 57 | 58 | 59 | 60(C) | 61(C) | 62(C) |
|---|---|---|---|---|---|---|---|---|---|---|
| Deposits on reactor wall | ○ | ○ | ○ | ○ | ○ | ○ | ○ | X | XX | XX |
| Fine coagula | ○ | ○ | ○ | ○ | ○ | ○ | ○ | XX | XX | XX |

PREPARATION OF POLYMER LATEX (8)

Monomers, a chain transfer agent and an aliphatic ether or ester shown in Table 8, and also sodium dodecylbenzenesulfonate (0.6 part), sodium hydrogencarbonate (0.5 part), ammonium persulfate (0.8 part) and water (100 parts) were charged in a 10 liters autoclave and polymerized while stirring at 65° C. A polymerization conversion was 99% or higher in all cases.

To each latex, a 10% sodium hydroxide was added to adjust pH at 8, and the ether or ester were removed by steam distillation to obtain the copolymer latex. In all cases, the total residual amount of the unreacted monomers and the ether or ester was 0.1 parts per 100 parts of the solid content in the copolymer latex.

mechanical shear, and a time at which coagula are formed on the rubber roll (minutes) is recorded. The longer time means better stability.

Then, the paper coating composition was coated on one surface of a sheet of paper to an amount of 10 g/m² and RI wet pick, RI dry pick and blister resistance of the coated paper were measured as follows:

RI WET PICK

By using an RI printing machine, the coated paper is printed with wetting water and a degree of picking is evaluated with naked eyes and classified from First Degree (the best) to Fifth Degree (the worst). An avermage value of six time evaluation is shown.

TABLE 8

| Latex No. | 63 | 64 | 65 | 66 | 67 | 68 | 69 | 70(C) | 71(C) | 72(C) |
|---|---|---|---|---|---|---|---|---|---|---|
| Composition (parts) | | | | | | | | | | |
| 1,3-Butadiene | 15 | 35 | 35 | 35 | 40 | 40 | 70 | 25 | 35 | 50 |
| Styrene | 66 | 51 | 48 | 62 | 36 | 43 | 17 | 57 | 52 | 42 |
| Methyl methacrylate | 15 | — | 15 | — | 15 | — | 10 | 15 | — | 5 |
| Acrylonitrile | — | 10 | — | — | 5 | 15 | — | — | 10 | — |
| β-Hydroxyethyl acrylate | 1 | — | 1 | — | 1 | 1 | 1 | 1 | — | 1 |
| Acrylamide | — | 2 | — | 1 | — | — | — | — | 1 | — |
| Itaconic acid | 1 | — | — | 2 | — | 1 | 2 | 1 | 1 | 2 |
| Fumaric acid | 2 | 2 | — | — | 3 | — | — | 1 | — | — |
| Acrylic acid | — | — | 1 | — | — | — | — | — | 1 | — |
| tert.-Dodecyl mercaptan | 1.2 | 0.8 | — | — | 0.3 | — | 2.5 | — | — | 2.5 |
| α-Methylstyrene dimer | — | — | 2.0 | — | 0.2 | — | — | 0.8 | — | — |
| Terpinolene | — | — | — | 6.0 | — | 3 | — | — | 3 | — |
| Butyl acetate | 10 | — | — | — | 6 | — | — | — | — | — |
| Methyl isobutyrate | — | 10 | — | 30 | — | — | — | — | — | — |
| Isopropyl ether | — | — | — | — | — | 50 | — | — | — | — |
| Isobutyl ether | — | — | 3 | — | — | — | 10 | — | — | — |
| Results of polymerization | | | | | | | | | | |
| Deposits on reactor wall | X | ○ | ○ | ○ | ○ | ○ | ○ | X | XX | XX |
| Fine coagula | ○ | ○ | ○ | ○ | ○ | ○ | X | XX | XX | XX |

PREPARATION OF PAPER COATING COMPOSITION

By using each of the copolymer latex Nos. 13 to 24, a paper coating composition having the following composition was prepared:

| Composition | Parts |
|---|---|
| Kaolin clay | 80 |
| Calcium carbonate | 20 |
| Denatured starch | 8 |
| Copolymer latex | 12 (solid content) |

Mechanical stability of the paper coating composition was evaluated as follow:

The coating composition is kneaded between a metal roll and a rubber roll with a patastabili-tester to apply

RI DRY PICK

The same procedures as in RI wet pick test are repeated except that no wetting water is used.

BLISTER RESISTANCE

Wetness of a coated paper the both surfaces of which are printed is adjusted to about 6% and poured in a heated oil bath, and a minimum temperature at which blisters.

The results are shown in Table 9.

TABLE 9

| Latex No. | 12 | 13 | 14 | 15 | 16 | 17 | 18 | 19 | 20(C) | 21(C) | 22(C) |
|---|---|---|---|---|---|---|---|---|---|---|---|
| Mechanical stability of coating color (minutes) | >30 | >30 | >30 | 25 | >30 | >30 | >30 | 20 | 2 | 1 | 5 |
| Properties of coated paper | | | | | | | | | | | |
| RI wet pick | 2.9 | 2.2 | 1.3 | 1.8 | 1.1 | 2.1 | 3.5 | 3.1 | 2.8 | 2.4 | 4.9 |
| RI dry pick | 3.3 | 3.0 | 1.8 | 3.0 | 2.5 | 1.2 | 1.1 | 1.9 | 4.8 | 3.8 | 2.8 |
| Blister resistance (°C.) | 250 | 240 | 210 | 250 | 220 | 180 | 190 | 230 | 190 | 180 | 160 |

PREPARATION OF ADHESIVE COMPOSITION FOR CARPET LINING

A pH value of each of the copolymer latex Nos. 25 to 30 was adjusted at 8.5 with an aqueous solution of sodium hydroxide. To the copolymer latex having pH of 8.5 (100 parts), Aron T-40 (a low molecular weight polysodium acrylate manufactured by Toa Gosei) (1.0 part) as a dispersant and heavy calcium carbonate (400 parts) were added and then Aron A-20P (high molecular weight polysodium acrylate manufactured by Toa Gosei) (1.0 part) as a thickner followed by addition of ion-exchanged water to a solid concentration of 75% to obtain an adhesive composition for carpet lining having a viscosity of 17,000 to 20,000 centipoise (measured by a BM type rotation viscometer with a #4 rotor at 12 rpm, 20° C.).

The adhesive composition was uniformly applied on a back face of a tufted carpet having a foundation of polypropylene split yarns and a pile of § inch gauge 6-nylon at an apparent amount of 1200 g/m², and to the adhesive composition layer, a jute fabric liner was bonded and the adhesive composition was dried at 120° C. for 20 minutes to produce a jute lined carpet.

The produced carpet was subjected to an adhesive strength test according to JIS 10211.

The carpet produced in the same manner as above was dipped in ion-exchanged water at 20° C. for one hour and subjected to the adhesive strength test according to JIS 10211. The results are shown in Table 10.

TABLE 10

| Latex No. | 23 | 24 | 25 | 26 | 27(C) | 28(C) |
|---|---|---|---|---|---|---|
| Initial peel strength (kg/5 cm) | 4.2 | 4.1 | 4.0 | 4.1 | 3.8 | 3.7 |
| Initial strength of yarn extraction (kg/5 cm) | 3.4 | 3.4 | 3.3 | 3.5 | 2.7 | 2.8 |
| Peel strength after immersion in water (kg/5 cm) | 2.2 | 2.1 | 2.0 | 2.1 | 2.0 | 2.0 |
| Strength of yarn extraction after immersion in water (kg/5 cm) | 2.8 | 2.8 | 2.9 | 2.8 | 2.2 | 2.2 |

PREPARATION OF ADHESIVE COMPOSITION FOR ROCK FIBER SUBSTRATE

To each of the copolymer latex Nos. 31 to 40 (100 parts of solid content), zinc oxide (2 parts), zinc dibutyl-dithiocarbamate (1 part) and Antigen S (styrenated phenol manufactured by Sumitomo Chemical Co., Ltd.) (1 part) were added and then carboxymethylcellulose (0.3 part) as a tackifier was added, followed by addition of ion-exchanged water to a solid content of 48.0% to obtain an adhesive composition for adhering a rock fiber substrate, which composition had a viscosity of 1000 to 1300 centipoise (measured by a BM type rotation viscometer with a #3 rotor at 60 rpm, 20° C.).

Two grams of the adhesive composition was spray coated on a surface of a palm rock fabric of 100 mm in length, 100 mm in width and 20 mm in thickness (3.0 g) and dried at 80° C. for 10 minutes. On the back face of the fabric, the adhesive composition was spray coated in the same manner as above and dried at 80° C. for 10 minutes. Thereafter, the coated fabric was heated at 130° C. for 15 minutes to proceed cross linking to prepare a rock testing piece.

With the testing piece, adhesive strength and water resistance of adhesive strength were measured. The results are shown in Table 11.

TABLE 11

| Latex No. | 29 | 30 | 31 | 32 | 33 | 34 | 35(C) | 36(C) | 37(C) | 38(C) |
|---|---|---|---|---|---|---|---|---|---|---|
| Adhesion strength (kg/cm²) | 3.1 | 3.6 | 3.5 | 3.7 | 4.0 | 4.3 | 2.1 | 2.4 | 3.0 | 3.3 |
| Water resistance Adhesion strength after immersion (kg/cm²) | 2.6 | 3.0 | 3.1 | 3.1 | 2.7 | 2.1 | 1.6 | 2.0 | 1.8 | 1.5 |

What is claimed is:

1. A process for preparing a copolymer latex which comprises emulsion copolymerizing 10 to 80% by weight of an aliphatic conjugated diene monomer, 1 to 10% by weight of an ethylenically unsaturated carboxylic acid monomer and 10 to 89% by weight of at least one monoolefinic monomer in the presence of a chain transfer agent in an amount of 0.05 to 10 parts by weight per 100 parts by weight of the total amount of monomers and at least one compound having no copolymerizing reactivity selected from the group consisting of hydrocarbons having 5 to 12 carbon atoms, halogenated aromatic hydrocarbons, five or six membered ring heterocyclic compounds, aliphatic ethers and aliphatic esters in an amount of 1 to 100 parts by weight per 100 parts by weight of the total amount of the monomers.

2. The process according to claim 1, wherein said aliphatic conjugated diene monomer is at least one selected from the group consisting of 1,3-butadiene, 2-methyl-1,3-butadiene, 2,3-dimethyl-1,3-butadiene, 2-chloro-1,3-butadiene, substituted linear conjugated pentadienes, and substituted and/or branched conjugated hexadienes.

3. The process according to claim 1, wherein said monolefinic monomer is at least one selected from the group consisting of an ethylenically unsaturated carboxylic acid monomer, an alkenyl aromatic monomer, an unsaturated alkyl carboxylate monomer, an unsaturated monomer having a hydroxyalkyl group, a vinyl cyanide monomer and an unsaturated carboxylic amide monomer.

4. The process according to claim 1, wherein said hydrocarbon having 5 to 12 carbon atoms which has no copolymerizing reactivity is at least one compound selected from the group consisting of an aromatic hydrocarbon, an alicyclic hydrocarbon and a linear hydrocarbon.

5. The process according to claim 4, wherein said aromatic hydrocarbon is at least one aromatic hydrocarbon selected from the group consisting of benzene, toluene, o-xylene, m-xylene, p-xylene, cumene, 1,2,3-trimethylbenzene, 1,2,4-trimethylbenzene and 1,2,5-trimethylbenzene.

6. The process according to claim 4, wherein said alicyclic hydrocarbon is at least one compound selected from the group consisting of cyclopentane, cyclohexane, cycloheptane, cyclooctane and methylcyclohexane.

7. The process according to claim 1, wherein said halogenated aromatic hydrocarbon having no copolymerizing reactivity is at least one compound selected from the group consisting of fluorobenzene, 2-fluorotoluene, 3-fluorotoluene, 4-fluorotoluene, 1,2-difluorobenzene, 1,3-difluorobenzene, 1,4-difluorobenzene, 1,2,3-trifluorobenzene, chlorobenzene, 2-chlorotoluene, 3-chlorotoluene, 4-chlorotoluene, benzyl chloride, 1,2- dichlorobenzene, 1,3-dichlorobenzene, 1,4-dichlorobenzene, bromobenzene, 2-bromotoluene, 3-bromotoluene, 4-bromotoluene, 1-chloro-2-fluorobenzene, 1-chloro-3-fluorobenzene and 1-chloro-4-fluorobenzene.

8. The process according to claim 1, wherein said five or six membered heterocyclic compound having no copolymerizing reactivity is at least one compound selected from the group consisting of furan, thiophene, tetrahydrothiophene, 2-methylthiophene, pyrrole, pyridine, pyrimidine, pyrrolidine, 1,4-dioxane, 1,3-dioxane and morpholine.

9. The process according to claim 1, wherein said aliphatic ether or ester having no copolymerization reactivity is at least one compound selected from the group consisting of ethyl ether, propyl ether, isopropyl ether, methyl propyl ether, methyl isopropyl ether, methyl butyl ether, methyl isobutyl ether, methyl n-amyl ether, methyl isoamyl ether, ethyl propyl ether, ethyl isopropyl ether, ethyl butyl ether, ethyl isobutyl ether, methyl acetate, ethyl acetate, propyl acetate, isopropyl acetate, butyl acetate, isobutyl acetate, methyl propionate, ethyl propionate, rate, ethyl butyrate, methyl isobutyrate, ethyl isobutyrate, methyl valerate, ethyl valerate and methyl isovalerate.

10. The process according to claim 1, wherein substantially all the compound having no copolymerizing reactivity is removed after copolymerization.

* * * * *

UNITED STATES PATENT AND TRADEMARK OFFICE
CERTIFICATE OF CORRECTION

PATENT NO. : 5,284,908

DATED : February 8, 1994

INVENTOR(S) : WATARU FUJIWARA ET AL

It is certified that error appears in the above-identified patent and that said Letters Patent is hereby corrected as shown below:

Claim 9 (column 18, line 8), "rate" should be -- propyl propionate, isopropyl propionate, methyl butyrate --.

Signed and Sealed this

Twenty-fourth Day of May, 1994

Attest:

BRUCE LEHMAN

*Attesting Officer*  *Commissioner of Patents and Trademarks*